(12) United States Patent
Kallassi et al.

(10) Patent No.: US 11,137,534 B2
(45) Date of Patent: Oct. 5, 2021

(54) SYSTEMS AND METHODS FOR OPTICAL IMAGING BASED ON DIFFRACTION GRATINGS

(71) Applicant: Synaptics Incorporated, San Jose, CA (US)

(72) Inventors: Pascale El Kallassi, San Jose, CA (US); Marek Mienko, San Jose, CA (US); Patrick Smith, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 139 days.

(21) Appl. No.: 16/453,725

(22) Filed: Jun. 26, 2019

(65) Prior Publication Data
US 2020/0408982 A1    Dec. 31, 2020

(51) Int. Cl.
| | |
|---|---|
| *G06K 9/00* | (2006.01) |
| *F21V 8/00* | (2006.01) |
| *G06K 9/20* | (2006.01) |
| *G02B 5/18* | (2006.01) |

(52) U.S. Cl.
CPC ......... *G02B 6/0036* (2013.01); *G02B 5/1819* (2013.01); *G02B 6/0065* (2013.01); *G06K 9/2036* (2013.01)

(58) Field of Classification Search
CPC .. G02B 6/0036; G02B 5/1819; G02B 6/0065; G06K 9/2036
See application file for complete search history.

(56) References Cited

U.S. PATENT DOCUMENTS

| | | | |
|---|---|---|---|
| 10,048,792 B1* | 8/2018 | Schediwy | G06F 3/0418 |
| 2012/0321149 A1* | 12/2012 | Carver | G06K 9/0012 |
| | | | 382/124 |
| 2014/0293759 A1 | 10/2014 | Taff et al. | |
| 2014/0300840 A1 | 10/2014 | Fattal et al. | |
| 2014/0300947 A1 | 10/2014 | Fattal et al. | |
| 2014/0300960 A1* | 10/2014 | Santori | G02B 6/003 |
| | | | 359/462 |
| 2015/0036068 A1 | 2/2015 | Fattal et al. | |
| 2016/0033705 A1 | 2/2016 | Fattal | |
| 2017/0205618 A1* | 7/2017 | Basset | G02B 6/0036 |
| 2019/0095671 A1* | 3/2019 | Yeke Yazdandoost | |
| | | | G06K 9/2036 |

(Continued)

FOREIGN PATENT DOCUMENTS

| | | |
|---|---|---|
| WO | WO 2016/111706 A1 | 7/2016 |
| WO | WO 2016/111707 A1 | 7/2016 |
| WO | WO 2016/111708 A1 | 7/2016 |

(Continued)

*Primary Examiner* — Dhaval V Patel
(74) *Attorney, Agent, or Firm* — Leydig, Voit & Mayer, Ltd.

(57) ABSTRACT

Disclosed is a device comprising: a light guide configured to receive incident light from one or more light sources; a cover layer with a sensing surface configured to receive an input object to be sensed; and a set of photodetectors. The light guide includes diffraction gratings configured to diffract the incident light as diffracted light, wherein the diffracted light exits the light guide and travels towards the sensing surface. The diffracted light is reflected from the sensing surface as reflected light. The reflected light is sensed by the set of photodetectors to form an image of the input object.

20 Claims, 14 Drawing Sheets

(56) References Cited

U.S. PATENT DOCUMENTS

2020/0203468 A1\* 6/2020 Zeng .................. H01L 27/3262

FOREIGN PATENT DOCUMENTS

| | | |
|---|---|---|
| WO | WO 2016/111709 A1 | 7/2016 |
| WO | WO 2016/118107 A1 | 7/2016 |
| WO | WO 2016/122679 A1 | 8/2016 |
| WO | WO 2016/138507 A1 | 9/2016 |
| WO | WO 2016/148689 A1 | 9/2016 |
| WO | WO 2016/160048 A1 | 10/2016 |
| WO | WO 2016/171705 A1 | 10/2016 |
| WO | WO 2016/182549 A1 | 11/2016 |
| WO | WO 2016/195647 A1 | 12/2016 |
| WO | WO 2017/039725 A1 | 3/2017 |
| WO | WO 2017/039729 A1 | 3/2017 |
| WO | WO 2017/039750 A1 | 3/2017 |
| WO | WO 2017/039756 A1 | 3/2017 |
| WO | WO 2017/039825 A1 | 3/2017 |
| WO | WO 2017/039876 A1 | 3/2017 |
| WO | WO 2017/041073 A1 | 3/2017 |
| WO | WO 2017/041079 A1 | 3/2017 |

\* cited by examiner

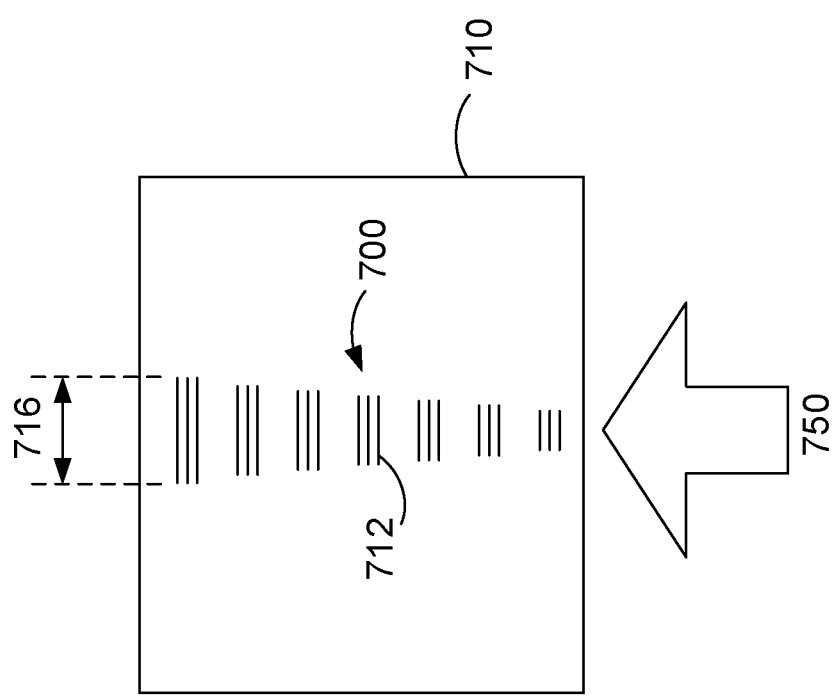

SYSTEMS AND METHODS FOR OPTICAL IMAGING BASED ON DIFFRACTION GRATINGS

FIELD

This disclosure generally relates to optical sensors and, more particularly, to systems and methods for optical imaging based on diffraction gratings.

BACKGROUND

Object imaging is useful in a variety of applications. By way of example, biometric recognition systems image biometric objects for authenticating and/or verifying users of devices incorporating the biometric recognition systems. Biometric imaging provides a reliable, non-intrusive way to verify individual identity for recognition purposes. Various types of sensors may be used for biometric imaging.

SUMMARY

One embodiment provides a device, comprising: a light guide configured to receive incident light from one or more light sources; a cover layer with a sensing surface configured to receive an input object to be sensed; and a set of photodetectors; wherein: the light guide includes diffraction gratings configured to diffract the incident light as diffracted light, wherein the diffracted light exits the light guide and travels towards the sensing surface; the diffracted light is reflected from the sensing surface as reflected light; and the reflected light is sensed by the set of photodetectors to form an image of the input object.

Another embodiment provides a light guide, comprising a substrate and a set of diffraction gratings. The substrate is configured to receive incident light from one or more light sources. The set of diffraction gratings is configured to diffract the incident light as diffracted light, wherein the diffracted light exits the light guide and travels towards a sensing surface configured to receive an input object to be sensed.

Yet another embodiment provides a method for performing optical sensing. The method includes: receiving light from a light source into a light guide; diffracting the light using a set of diffraction gratings to cause diffracted light to exit the light guide, where the diffracted light is reflected from a sensing surface as reflected light; and detecting the reflected light using one or more photodetectors to form an image of an input object placed on the sensing surface; wherein the diffracted light travels towards the sensing surface at an angle that causes the diffracted light that is incident on a portion of the input object to be partially transmitted through the input object and causes the diffracted light that is not incident on a portion of the input object to be reflected from the sensing surface.

BRIEF DESCRIPTION OF THE DRAWINGS

FIGS. 7A-7B are block diagrams illustrating diffraction gratings on a substrate, according to some embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described herein, embodiments of the disclosure provide a system and method for optical imaging using diffraction gratings. According to various embodiments, diffraction gratings include grating elements or structures that can diffract light in one or more directions. In some cases, the structures of a diffraction grating are periodic. The one or more directions of the diffracted light depend on various factors, for example, periodicity of the diffraction grating, a depth of the grating structures, and/or wavelength of the incident light. In various embodiments, incident light is provided from one or more light sources and enters a light guide. The light guide includes or is coupled to a substrate that includes diffraction gratings. The incident light is diffracted by the diffraction gratings and is directed towards a sensing region of an electronic device. An input object, such as a finger, may be placed in the sensing region. The diffracted light travels towards the input object and is reflected from the sensing region and/or input object. The reflected light is sensed by photodetectors of an optical sensor. An image of the input object can be generated based on the reflected light. As such, the diffraction gratings cause directional light to be incident at the sensing region, which is reflected from the sensing region to obtain an optical image of the input object. By providing directional light incident onto the sensing region, the reflected light from the sensing region does not need to be further collimated (e.g., for example by a collimator filter layer) before reaching the optical sensor.

In some embodiments, the diffraction gratings are placed above a display of the electronic device and are configured so as not to interfere with the display illumination. In other embodiments, the diffraction gratings can be placed in other positions with the electronic device, such as for example, below the display.

Figure 1:
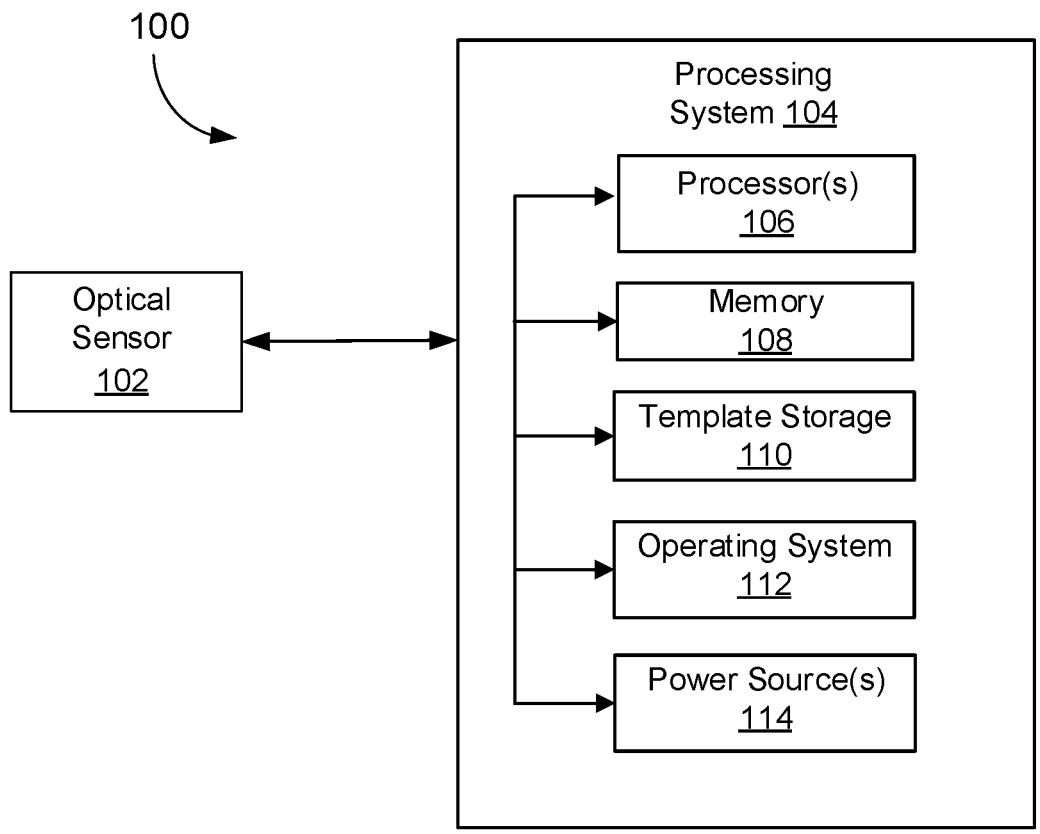
FIG. 1 is a block diagram of an example of a system that includes an optical sensor and a processing system, according to an embodiment.

Turning to the drawings, FIG. 1 is a block diagram of an example of an electronic device 100 that includes an optical sensor 102 and a processing system 104, according to an embodiment of the disclosure.

The processing system 104 may include processor(s) 106, memory 108, template storage 110, operating system (OS) 112, and power source(s) 114. Processor(s) 106, memory 108, template storage 110, and operating system 112 may be connected physically, communicatively, and/or operatively to each other directly or indirectly. The power source(s) 114 may be connected to the various components in processing system 104 to provide electrical power as necessary.

As illustrated, the processing system 104 may include processing circuitry including one or more processor(s) 106 configured to implement functionality and/or process instructions for execution within electronic device 100. For example, processor(s) 106 execute instructions stored in memory 108 or instructions stored on template storage 110 to normalize an image, reconstruct a composite image, identify, verify, or otherwise match a biometric object, or determine whether a biometric authentication attempt is successful. Memory 108, which may be a non-transitory, computer-readable storage medium, may be configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 may also maintain program instructions for execution by the processor(s) 106.

Template storage 110 may comprise one or more non-transitory computer-readable storage media. In the context of a fingerprint sensor device or system, the template storage 110 may be configured to store enrollment views or image data for fingerprint images associated with a user's fingerprint, or other enrollment information, such as template identifiers, enrollment graphs containing transformation information between different images or view, etc. More generally, the template storage 110 may store information about an input object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 may also host an operating system (OS) 112. The operating system 112 may control operations of the components of the processing system 104. For example, the operating system 112 facilitates the interaction of the processor(s) 106, memory 108, and template storage 110.

According to some embodiments, the processor(s) 106 implements hardware and/or software to obtain data describing an image of an input object. In some implementations, the processor(s) 106 may also determine whether there is a match between two images, e.g., by aligning two images and compare the aligned images to one another. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 may include one or more power source(s) 114 to provide power to the electronic device 100. For example, the power source(s) 114 may provide power to one or more of the components of the processing system 104 and/or to the optical sensor 102. In some implementations, the power source(s) 114 may be external to the processing system 104 or external to the electronic device 100. Non-limiting examples of power source(s) 114 include single-use power sources, rechargeable power sources, and/or power sources developed from nickel-cadmium, lithium-ion, or other suitable material as well power cords and/or adapters, which are in turn connected to electrical power.

Optical sensor 102 can be implemented as a physical part of the electronic device 100, or can be physically separate from the electronic device 100. As appropriate, the optical sensor 102 may communicate with parts of the electronic device 100 using any one or more of the following: buses, networks, and other wired or wireless interconnection and communication technologies, such as buses and networks. Examples technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 standard. In some embodiments, optical sensor 102 is implemented as a fingerprint sensor to capture a fingerprint image of a finger of a user. In accordance with the disclosure, the optical sensor 102 uses optical sensing for the purpose of object imaging including imaging biometrics such as fingerprints. The optical sensor 102 can be incorporated as part of a display, for example, or may be a discrete sensor.

Some non-limiting examples of electronic devices 100 include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras).

In some embodiments, the optical sensor 102 may provide illumination to the sensing region. In other embodiments, a light source separate from the optical sensor 102 may provide illumination to the sensing region. Reflections from the sensing region in the illumination wavelength(s) are detected to determine input information corresponding to the input object.

The optical sensor 102 may utilize principles of direct illumination of the input object, which may or may not be in contact with a sensing surface of the sensing region depending on the configuration. One or more light sources and/or light guiding structures may be used to direct light to the sensing region. In some embodiments, the light guiding structures may include diffraction gratings configured to diffract incident light and direct the diffracted light towards the sensing region. When an input object is present, the diffracted light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the sensing surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the sensing surface.

Figure 2:
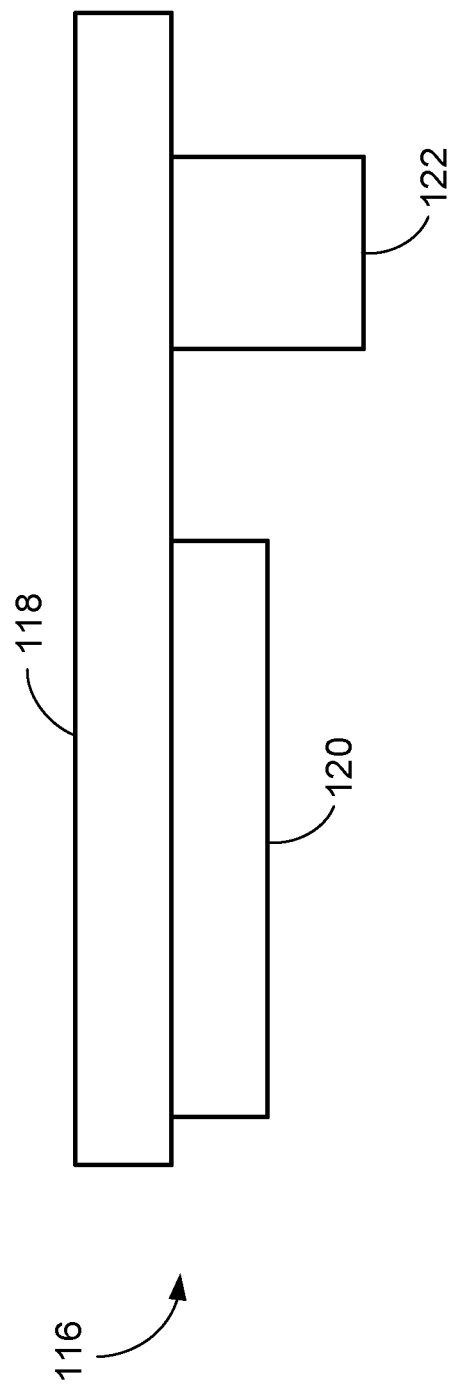
FIG. 2 illustrates an example of an electronic device that includes an optical sensor according to an embodiment.

FIG. 2 illustrates an example of an electronic device 116, such as a mobile phone, which includes a cover layer, e.g., cover glass 118, over a display 120. The disclosed method and system may be implemented such that the display 120 includes an optical sensor to image an input object. Alternatively, a separate discrete component 122 includes an optical sensor that provides the optical sensing capabilities. A discrete component 122 may provide more flexibility in designing the optical components of the sensor for optimum illumination and/or signal conditioning than when attempting to integrate the optical sensor components on a display substrate, such as a thin film transistor (TFT) backplane. In one embodiment, the discrete component 122 is not located beneath the display 120, as shown in FIG. 2. In another embodiment, the discrete component 122 is located beneath the display 120.

Figure 3:
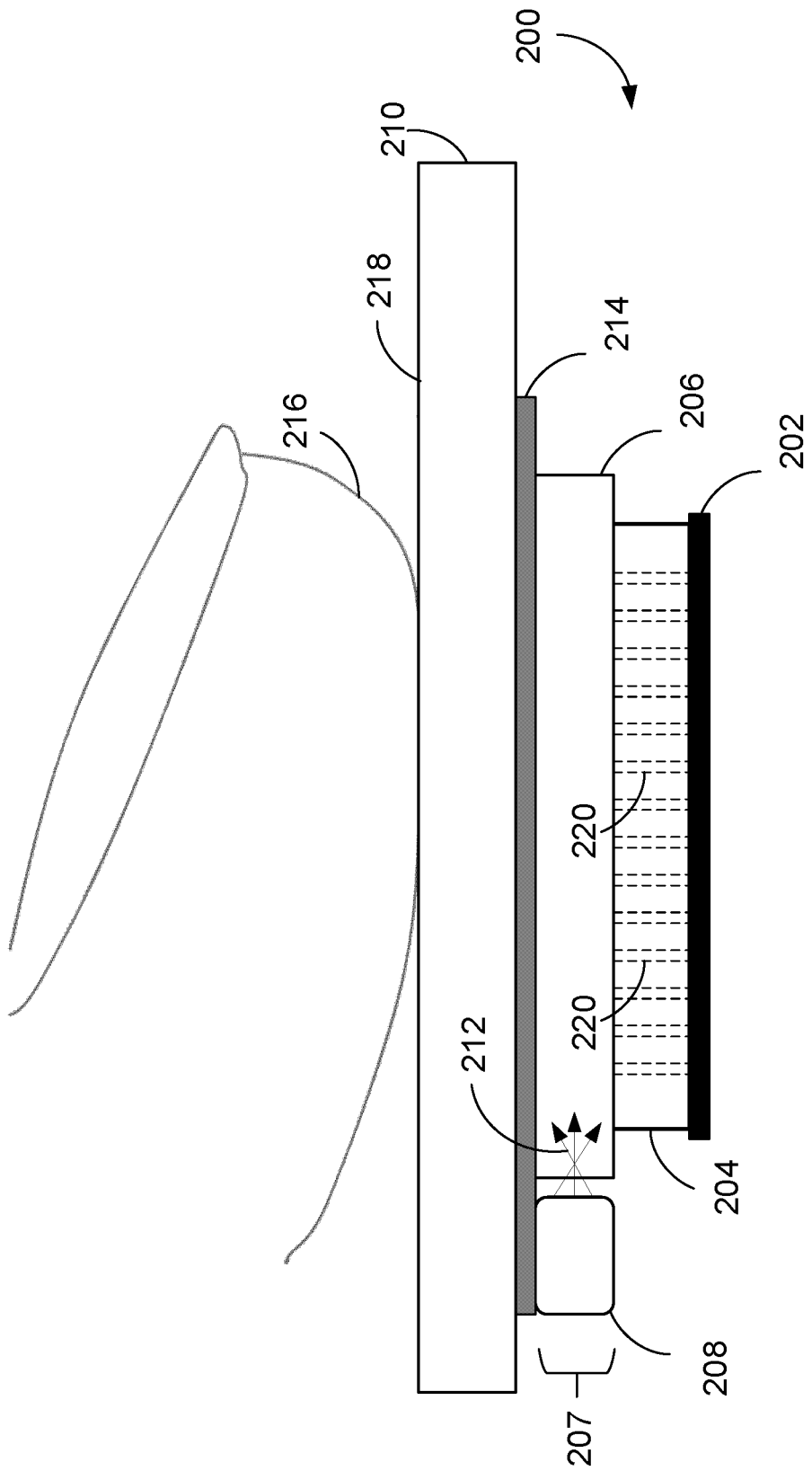
FIG. 3 illustrates an example of an optical sensor with a collimator filter layer according to an embodiment.

FIG. 3 illustrates an example of a stack-up for an optical sensor device 200 used to image an input object 216, such as a fingerprint. The optical sensor device 200 includes an image sensor array 202, a collimator filter layer (or light conditioning layer) 204 disposed above the image sensor array 202, an illumination layer 207 disposed above the collimator filter layer 204, a light source 208, and a cover layer 210. In certain embodiments, a blocking layer 214 may also be provided.

The cover layer 210 protects the inner components of the optical sensor device 200, such as the image sensor array 202. The cover layer 210 may include a cover glass or cover lens that protects inner components of a display in addition to the optical sensor device 200. A sensing region for the input object 216 is defined above the cover layer 210. A sensing surface 218 (i.e., top surface) of the cover layer 210 provides a contact area for the input object 216 (e.g., fingerprint). The cover layer 210 can be made of any suitable material such as glass, transparent polymeric materials and the like.

Although generally described in the context of a fingerprint for illustrative purposes, the input object 216 is any object to be imaged. The input object 216 may include various features, such as ridges and valleys. In general, when input object 216 comes into contact with the sensing surface 218, due to their protruding nature, the ridges contact the sensing surface 218 of the cover 210 layer. In contrast, the valleys do not contact the sensing surface 218 and instead form an air gap between the input object 216 and the sensing surface 218. The input object 216 may have other features such as stain, ink and the like that do not create significant structural differences in portions of the input object 216, but which affect its optical properties. The methods and systems disclosed herein are suitable for imaging such structural and non-structural features of the input object 216.

The illumination layer 207 includes a light source 208 and/or a light guiding element 206 that directs illumination to the sensing region in order to image the input object 216. As shown in FIG. 3, the light source 208 transmits beams or rays of light 212 into the light guiding element 206 and the transmitted light propagates through the light guiding element 206. The light guiding element 206 may utilize total internal reflection, or may include reflecting surfaces that extract light up towards the sensing region. Some of the light in the illumination layer 207 may become incident at the sensing surface 218 in an area that is contact with the input object 216. The incident light is in turn reflected back towards the collimator filter layer 204. In the example shown, the light source 208 is disposed adjacent to the light guiding element 206. However, it will be understood that the light source 208 may be positioned anywhere within the optical sensor device 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer.

The light provided by the illumination layer 207 to image the input object 216 may be in near infrared (NIR) or visible. The light can have a narrow band of wavelengths, a broad band of wavelengths, or operate in several bands.

The image sensor array 202 detects light passing through the collimator filter layer 204. Examples of suitable sensor arrays are complementary metal oxide semiconductor (CMOS) and charge coupled device (CCD) sensor arrays. The image sensor array 202 may include a plurality of individual optical sensing elements capable of detecting the intensity of incident light. In some embodiments, the image sensor array 202 is formed in a silicon sensor substrate. In other embodiments, the image sensor array 202 is formed on a glass thin film transistor substrate.

To achieve optical sensing of fingerprints and fingerprint-sized features through thicker cover layers 210, light reflected from the fingerprint is conditioned by the collimator filter layer 204 so that the light reaching a sensing element in the image sensor array 202 comes from a small spot on the input object 216 directly above or nearly directly above the sensor element. In the absence of such conditioning, any light arriving at a sensing element from a region on the object far away from the optical sensing elements contributes to image blurring. To condition the light, the collimator filter layer 204 is provided with an array of holes (e.g., apertures, or collimator holes) 220 with each aperture being directly above one or more optical sensing elements on the image sensor array 202.

The collimator filter layer 204 allows light rays reflected from the input object 216 (e.g., finger) at normal or near normal incidence to the collimator filter layer 204 to pass and reach the optical sensing elements of the image sensor array 202. In one embodiment, the collimator filter layer 204 is an opaque layer with array of holes 220. The collimator filter layer 204 may be laminated, stacked, or built directly above the image sensor array 202. By way of example, the collimator filter layer 204 may be made of a plastic material such as polycarbonate, PET, polyimide, carbon black, inorganic insulating or metallic materials, silicon, or SU-8. In certain embodiments, the collimator filter layer 204 is monolithic.

An optional blocking layer 214 may be part of optical sensor device 200. The blocking layer 214 may be a semi-transparent or opaque layer and may be disposed above the collimator filter layer 204. For example, the blocking layer 214 may be disposed between the cover layer 210 and the illumination layer 207, as shown in FIG. 3. Alternatively, the blocking layer 214 may be disposed between the illumination layer 207 and the collimator filter layer 204. The blocking layer 214 may be configured to obscure ambient light illumination from reaching the image sensor array 202, while still allowing the optical sensor device 200 to operate. The blocking layer 214 may include a number of different materials or sub-layers. For example, a thin metal or electron conducting layer may be used where the layer thickness is less than the skin depth of light penetration in the visible spectrum. Alternatively, the blocking layer 214 may include a dye and/or pigment or several dyes and/or pigments that absorb light, for example, in the visible spectrum. As yet another alternative, the blocking layer 214 may include several sub-layers or nano-sized features configured to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor device 200 is integrated. In some embodiments, a semitransparent layer may be used with visible illumination wavelengths to allow sufficient light to pass through the blocking layer to the sensing region, while still sufficiently obscuring components below.

In the example shown in FIG. 3, the light 212 emitted from the light source 208 is not conditioned before reaching the sensing surface and reflecting from the sensing surface 218. As such, the incident light at the sensing surface 218 can come from many different directions and angles based on how the light travels through the light guiding element 206. The reflected light is then filtered by the collimator filter layer 204 before being sensed by the image sensor array 202. However, including a collimator filter layer 204 can add to the overall cost of the device. Also, including a filter layer 204 blocks some of the light reflected from the sensing surface 218, thereby providing a lower signal-to-noise ratio, in some implementations. Embodiments of the disclosure provide systems and methods that condition the light before it is reflected from the sensing surface 218 using diffraction gratings, so that when the light is reflected from the sensing surface 218, no further collimating of the light is needed before the light reaches the image sensor array 202.

Figure 4:
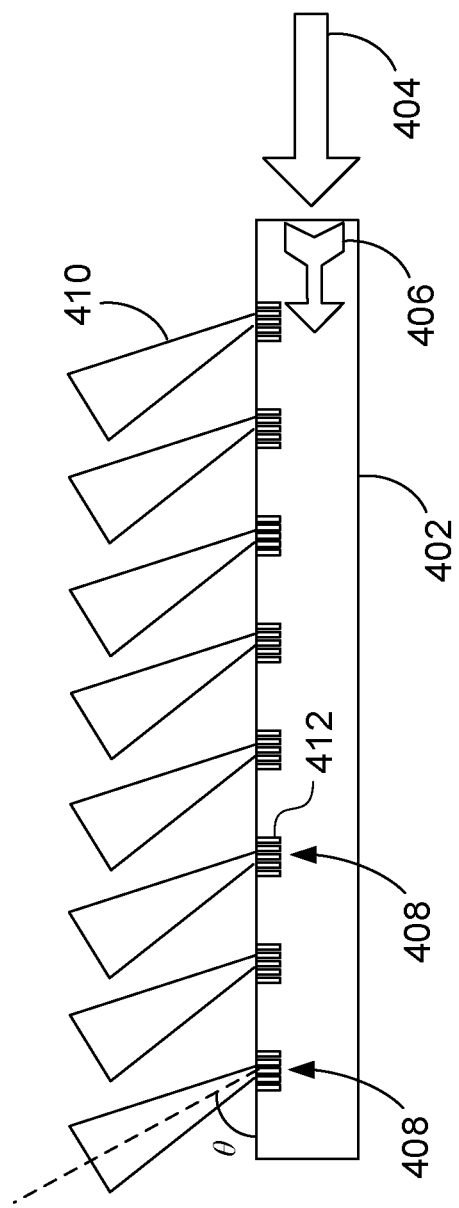
FIG. 4 is a block diagram illustrating a light guide with diffraction gratings, according to an embodiment.

FIG. 4 is a block diagram illustrating a light guide 402 with diffraction gratings 408, according to an embodiment. Each diffraction grating 408 comprises one or more grating structures 412. As shown, incident light 404 from a light source enters the light guide 402. The light is guided by the light guide 402 as guided light 406. The guided light 406 reaches diffraction gratings 408 and is diffracted by the diffraction gratings 408 as diffracted light 410. The diffraction gratings 408 may be configured such that the diffracted light 410 is directed towards a sensing region of an electronic device at one or more angles ($\theta$). In some embodiments, the one or more angles ($\theta$) may be angles that achieve principles of frustrated total internal reflection (FTIR), where the diffracted light 410 may be directed to the sensing surface at an angle of incidence at which it is totally internally reflected, except where the input object is in contact with the sensing surface and causes the light to partially transmit across the interface of the sensing surface.

According to various embodiments, the directions of the diffracted light 410 depend on various factors, for example, periodicity of the grating (i.e., spacing among the grating structures within a diffraction grating), a shape of individual grating structures of a diffraction grating, a depth of individual grating structures of a diffraction grating, a length of individual grating structures of a diffraction grating, and/or wavelength of the incident light, as described in greater detail herein. In one implementation, an equation that represents a grating may be:

$$d \times (\sin(\alpha) - \sin(\beta)) = m \times \lambda$$

where d is a grating period, $\alpha$ is an angle of incident light, $\beta$ is an angle of diffracted light, m is the order of diffraction, and $\lambda$ is the wavelength of the light.

Figure 5:
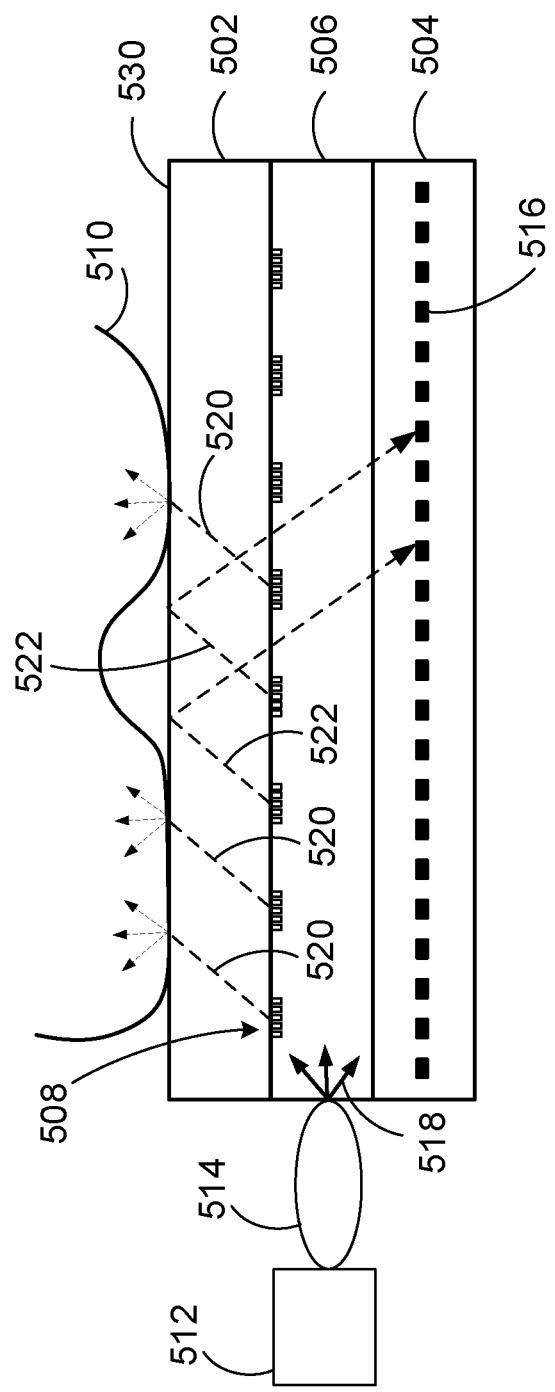
FIG. 5 is a block diagram illustrating a coupler that couples light from a light source to a light guide that includes diffraction gratings, according to one embodiment.

FIG. 5 is a block diagram illustrating a coupler 514 that couples light from a light source 512 to a light guide 506 that includes diffraction gratings 508, according to one embodiment. As shown, the electronic device includes a cover layer 502, a light guide 506, and an image sensor array 504. A top surface of the cover layer 502 may be sensing surface for optical sensing.

In the embodiment shown, the light guide 506 is provided as a separate layer than the cover layer 502. Light from the light source 512 enters the light guide 506 after passing through the coupler 514. The light 518 that exits the coupler 514 is diffracted by the diffraction gratings 508 towards the sensing surface 530.

Some of the light, represented by arrows 520, that is diffracted by the diffraction gratings 508 reaches the sensing surface 530 and interacts with input object 510 (e.g., a finger) at the sensing surface 530. Based on the difference in refractive indices of the cover layer 502 and the input object 510, the light scatters. However, some of the light, represented by arrows 522, that is diffracted by the diffraction gratings 508 reaches the sensing surface 530 and interacts with air (e.g., fingerprint valleys of a finger) at the sensing surface 530. Based on the difference in refractive indices of the cover layer 502 and air, the light is reflected at the sensing surface 530 and is sensed by photodetectors 516 of the image sensor array 504.

In one embodiment, the coupler 514 comprises one or more lenses or other prismatic structures that narrow the angular divergence of the light emitted by the light source 512, i.e., the coupler 514 may be configured to narrow the angular divergence of the light to an angle less than the angle of angular divergence of the incident light. For example, if the light source 512 emits light with an angular divergence of 60°, the coupler 514 may be configured to narrow the angular divergence of light to an angle less than 60° (for example, 30°). In some embodiments, the coupler 514 may be omitted, e.g., the light source 512 may be placed in contact with the light guide 506.

In various embodiments, the image sensor array 504 may be disposed above or below a display layer. In some embodiments, the image sensor array 504 may be integrated with the display layer.

Figure 6:
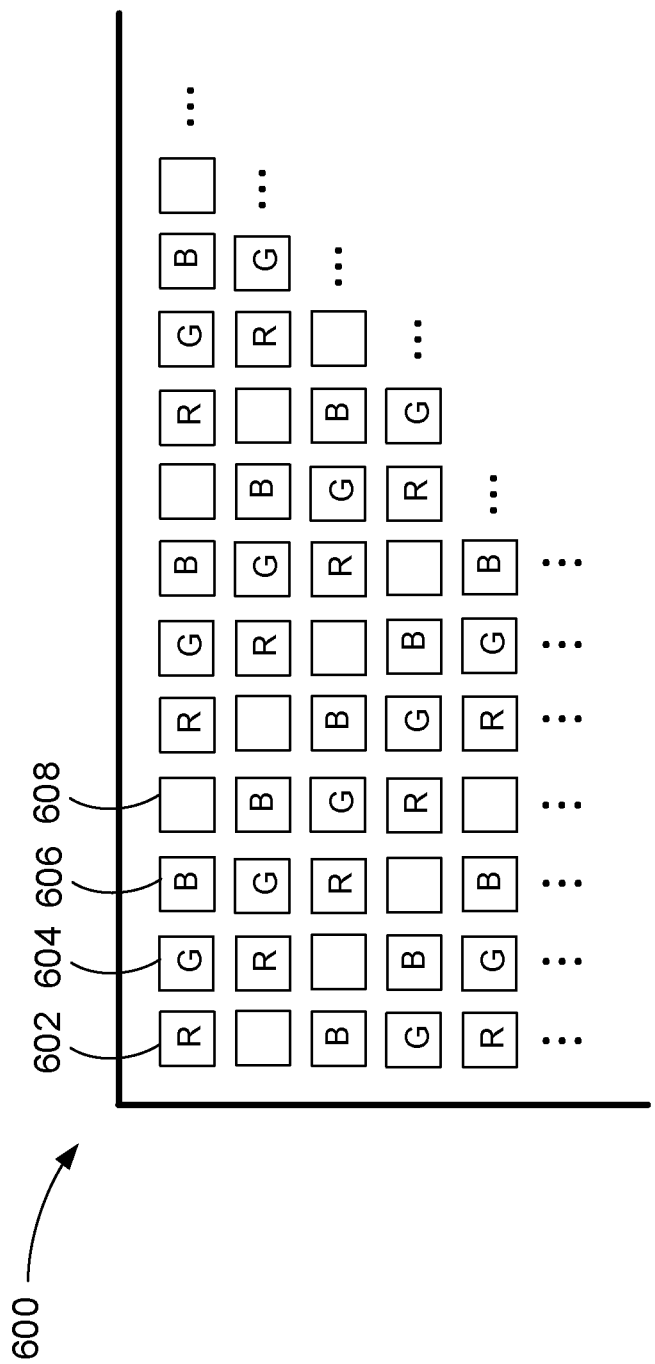
FIG. 6 is a block diagram illustrating a display layer that includes photodetectors, according to one embodiment.

FIG. 6 is a block diagram illustrating a display layer 600 that includes photodetectors 608, according to one embodiment. The display layer 600 may be configured to provide the illumination for a display screen of an electronic device. The display layer 600 may comprise any display technology, such as for example OLED (organic light-emitting diode) or LCD (liquid crystal display).

Figure 8:
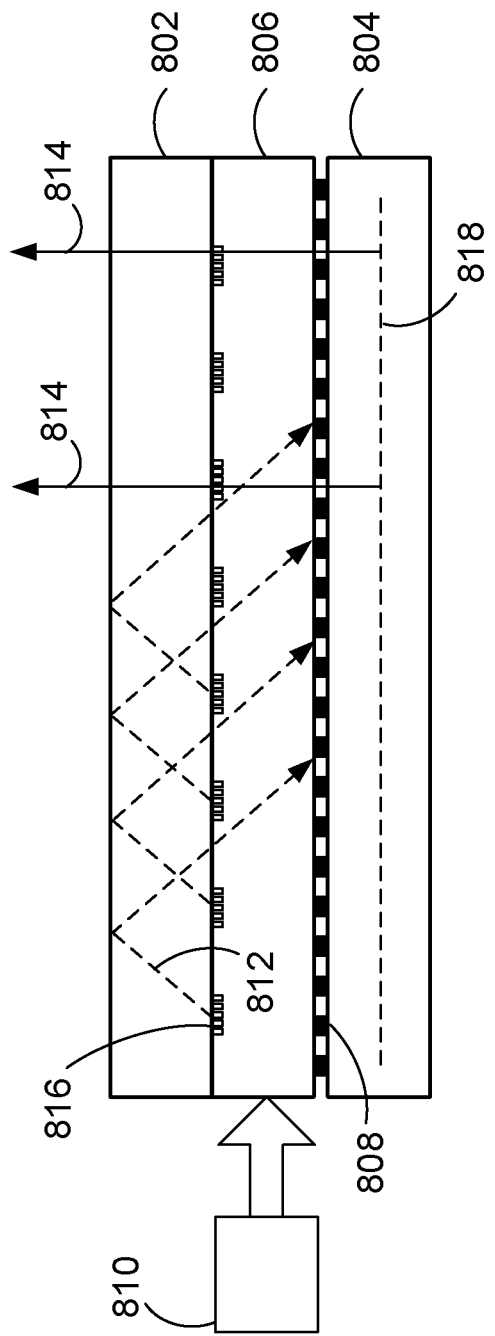
FIG. 8 is a block diagram of a stack-up of components of an electronic device, according to one embodiment.

In some embodiments, the display layer 600 may include red pixels 602, green pixels 604, and blue pixels 606 that provide the illumination for the display screen. The red pixels 602, green pixels 604, and blue pixels 606 can be arranged in a regular or irregular pattern in the display layer 600. The red pixels 602, green pixels 604, and blue pixels 606 may be oriented to emit light upwards to provide the illumination for the display screen, as shown in FIG. 8 below.

As also shown, the display layer 600 includes photodetectors 608 dispersed among the red pixels 602, green pixels 604, and blue pixels 606. In various embodiments, the photodetectors 608 may be dispersed in a regular or irregular pattern. The photodetectors 608 may comprises complementary metal oxide semiconductor (CMOS) or charge coupled device (CCD) photosensors.

Figure 7A:
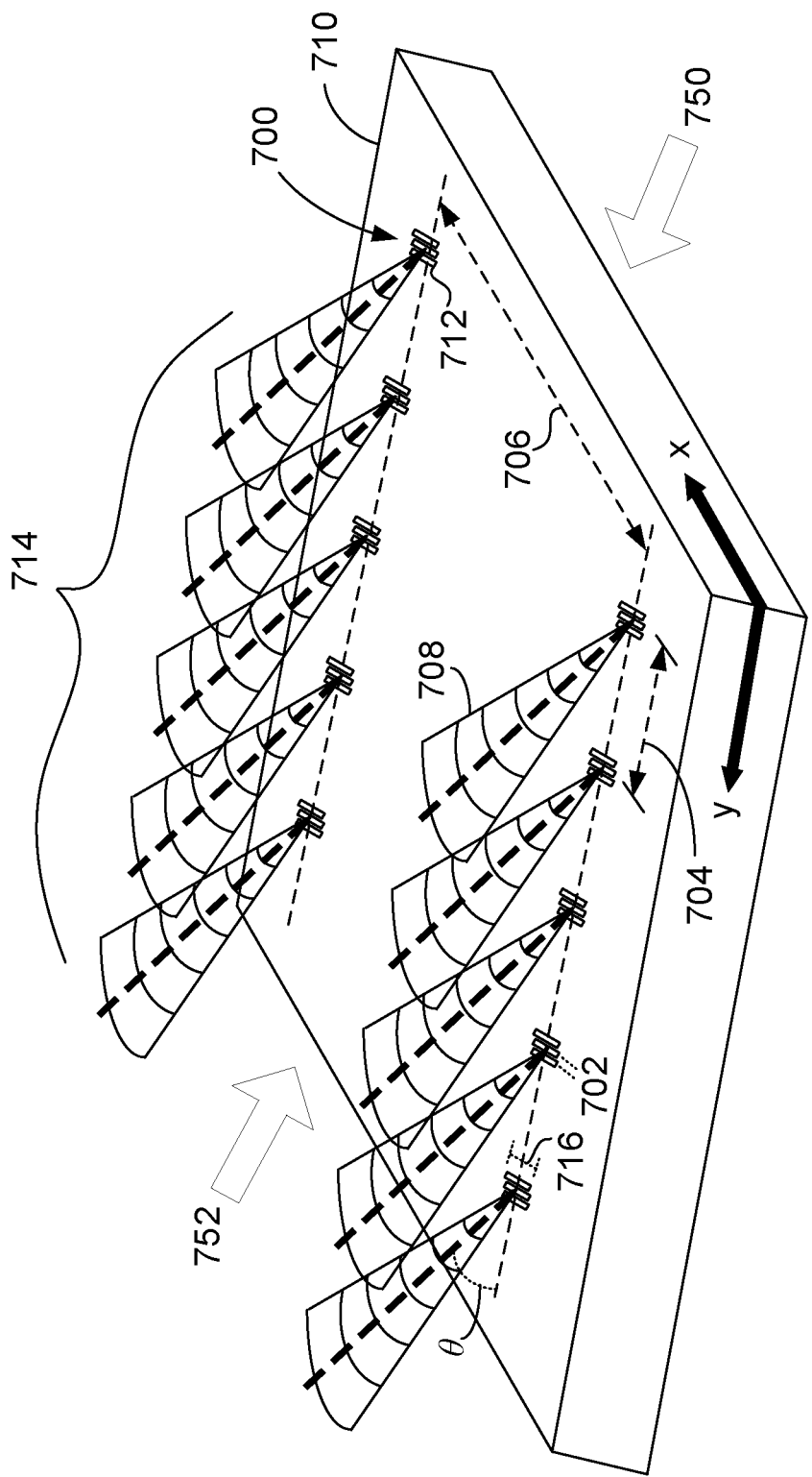

FIG. 7A is a block diagram illustrating diffraction gratings 700 on a substrate 710, according to one embodiment. The substrate 710 may be glass, or plastic, or acrylic, for example. Each diffractive grating 700 comprises one or more grating structures 712. In some embodiments, the grating structures 712 may be grooves or bumps formed by chemical etching the substrate 710, e.g., with silicon oxide. In other embodiments, the grating structures 712 can be formed by other techniques, such as embossing, molding, stamping, or printing organic materials onto the substrate 710. In another embodiment, a film may be created with grating structures formed thereon, and the film may be adhered to the substrate 710. In various embodiments, the grating structures 712 can have any shape, including concave hemisphere, convex hemisphere, concave square or rectangular, convex square or rectangular, etc. In some embodiments, the substrate 710 is a cover layer of the electronic device (i.e., a top-most surface of the device). In other embodiments, the substrate 710 is another layer other than the cover layer of the electronic device.

Light source 750 can input light into the substrate 710 from one or more light sources from the y-direction, relative to the orientation of FIG. 7A. The grating structures 712 within a diffractive grating 700 are spaced by spacing 702, which represents a periodicity of the diffractive grating 700. Spacing 702 may be the same or different among the grating structures 712 of diffraction grating 700. In some embodiments, the spacing 702 is dependent on the wavelength(s) of the light emitted by the light source 750. As also shown, the diffraction gratings 700 are spaced from one another in the y-direction by spacing 704. When the light from the light source 750 interacts with the diffraction gratings 700, the light is diffracted by the diffraction gratings 700 as diffracted light 708. The diffracted light 708 may take on many different shapes, depending on the particular implementation. As described, the directions of the diffracted light 708 depend on various factors, for example, periodicity of the diffractive gratings (for example, as represented by spacing 702 between individual grating structures 712 of a diffractive grating 700), a shape of individual grating structures, a depth of individual grating structures, a length of individual grating structures, and/or wavelength of the incident light. In one embodiment, the diffracted light 708 has angle theta (θ) relative to the surface of the substrate 710. As also shown, in one implementation, the diffracted light 708 has a cone-like shape in the x-direction. In some implementations, the diffraction gratings 700 are configured so as to set the angle theta (θ) of the diffracted light 708. In one embodiment, the diffraction gratings 700 may be configured such that the angle theta (θ) of the diffracted light 708 achieves total internal reflection when reflected from a sensing surface, in order to maximize the contrast between ridges and valleys.

As shown, the diffracted light 708 that exits the substrate 710 is structured light that has a periodicity corresponding to the spacing 704 between diffraction gratings 700. As such, diffracted light 708 from each diffraction grating 700 when reflected from a sensing surface, provides one piece of information (e.g., one pixel of data) about the input object. The spacing 704 between diffraction gratings 700, therefore, corresponds to the resolution (i.e., pixel density) of the information about the input object.

As also shown, the diffraction gratings 700 can be arranged in rows 714 based on a spacing 706 in the x-direction. In one embodiment, the spacing 706 is greater than the spacing 704. In other embodiments, the spacing 706 is less than or equal to the spacing 704. In some implementations, providing a spacing 706 that is greater than the spacing 704 allows for the diffracted light 708 from each diffraction grating 700 to spread in the x-direction (for example, spread in the cone-like shape in FIG. 7A) without interfering with diffracted light 708 from another diffraction grating 700 in an adjacent row 714 of diffraction gratings 700. In some embodiments, a plurality of rows 714 of diffraction gratings 700 can be provided, thereby forming a "sheet" of conditioned light. The sheet of conditioned light could extend, in some embodiments, over the entire display screen of an electronic device, for example, in an implementation where the optical sensor is disposed within the same area as display screen. As such, an entire display screen could be an input area for the optical sensor.

In one embodiment, within one row 714 of diffraction gratings 700, a length 716 (i.e., in the x-direction) of the grating structures 712 in the diffraction grating 700 may increase based on the distance (i.e., in the y-direction) from the light source 750 of the light (see FIG. 7B). In some implementations, increasing the length 716 of the grating structures 712 increases the amount of diffracted light 708 that exits from substrate 710 via the diffraction grating 700. By increasing the length 716 of the grating structures 712 in diffraction grating 700 that are further from the light source 750 of the light, more diffracted light 708 can be extracted to compensate for the light that has already been extracted by other grating structures of the diffraction grating that are closer to the light source 750 of the light.

In one embodiment, a single light source provides the light for two or more of the rows 714 of diffraction gratings 700. In some embodiments, multiple light sources may provide the light. For example, each light source may provide light for one or more different rows 714 of diffraction gratings 700. In various embodiments, the one or more light sources may each emit light of the same wavelength or may emit light of different wavelengths. The diffraction gratings 700 may be configured to diffract light based on the wavelength of the incident light from the one or more light sources. Still further, in some embodiments, light for one row of diffraction gratings may be incident from one side of the substrate 710 (e.g., light source 750); whereas, light for a different row of diffraction gratings may be incident from the opposite side of the substrate 710 (e.g., light source 752).

FIG. 7B is a top view of a substrate 710 that includes a plurality of diffraction gratings 700. Light from a light source 750 enters the substrate 710 and is diffracted by the diffraction gratings 700, as described herein. As shown in FIG. 7B, a length 716 of the grating structures 712 in a given diffraction grating 700 may increase for grating structures that are further away from the light source 750. Also as shown, in some embodiments, the lengths of the grating structures can vary among the different diffractive gratings, such that the longest grating structure of a first diffractive grating may be shorter than the shortest grating structure of a second diffractive grating. In some implementations, providing grating structures with a greater length 716 further away from the light source 750 increases the amount of diffracted light that exits from the grating structures. Although the diffraction gratings 700 in FIG. 7B are shown to include three grating structures 712 in the example shown, any number of one or more grating structures 712 can be included in a diffraction grating 700 in other implementations. Also, in some implementations, different diffraction gratings may include different numbers of grating structures. Also, in some implementations, grating structures within a diffraction grating and/or grating structures between gratings can have different shapes and/or depths. As described herein, the direction(s) of the diffracted light depend on various factors, for example, periodicity of the diffraction gratings, shapes of individual grating structures, a depth of individual grating structures, a length of individual grating structures, and/or wavelength of the incident light.

FIG. 8 is a block diagram of a stack-up of components of an electronic device, according to one embodiment. As shown, the electronic device includes a display layer 804, a light guide 806, and cover layer 802. The display layer 804 provides illumination for a display screen of the electronic device. The display layer 804 may include red, green, and blue LEDs (e.g., OLEDs) 818. As described in the example in FIG. 6, the display layer 804 may also include photodetectors 808. In FIG. 8, the photodetectors 808 are disposed above the OLEDs 818 in the display layer 804. In another implementation, the photodetectors 808 are co-planar with the OLEDs 818 in the display layer 804.

A light guide 806 is disposed on top of the display layer 804. The light guide 806 includes diffraction gratings 816. Light from a light source 810 enters the light guide 806 from the side of the light guide 806 and is transmitted through the light guide 806. The light exits the light guide 806 as diffracted light 812 after interacting with the diffraction gratings 816, as described herein. As also shown, display light 814 from the OLEDs 818 in the display layer 804 is not diffracted by the diffraction gratings 816 and exits the cover layer 802. The diffraction gratings 816 may be configured so as to diffract the light from the light source 810, but not diffract the display light 814 from the red, green, and blue LEDs of the display layer 804.

In various implementations, the display layer 804 can be transparent or semitransparent. For example, the display layer 804 may comprise a substantially transparent electrode pattern for the photodiodes 808 formed of ITO, micro wires, or some combination thereof, disposed above or within the same layer as the OLEDs 818 of the display layer 804.

In a further embodiment, a separate light guide layer is not provided. For example, the diffraction gratings 816 are located on a bottom side of the cover layer 802. In such an embodiment, the cover layer 802 acts as the light guide.

Figure 9A:
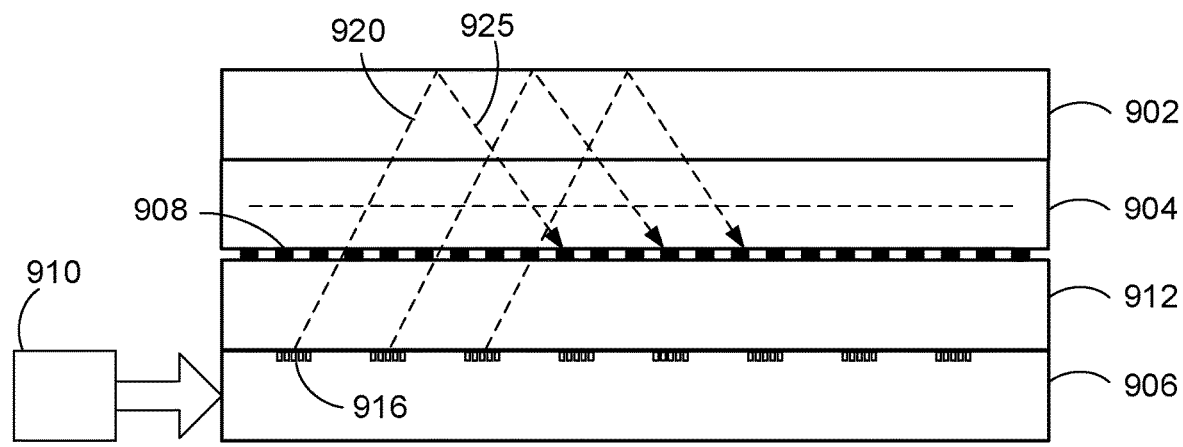
FIGS. 9A-9C are block diagrams of a stack-up of components of an electronic device, according to various embodiments.

FIG. 9A is a block diagram of a stack-up of components of an electronic device, according to one embodiment. As shown, the electronic device includes a cover layer 902 disposed above a display layer 904. The display layer 904 is disposed above an image sensor array 912. The image sensor array 912 is disposed above a light guide 906 that includes diffraction gratings 916. Light enters the light guide 906 from a light source 910.

The image sensor array 912 may comprise photodetectors 908 configured to detect light that originates from the light source 910 and travels through the light guide 906 until it is diffracted by the diffraction gratings 916 as diffracted light 920. The diffracted light 920 travels towards a sensing surface (i.e., a top surface of the cover layer 902) and is reflected from the sensing surface towards the photodetectors 908 as reflected light 925. In FIG. 9A, the photodetectors 908 are formed on the image sensor array 912, which is a separate layer than the display layer 904.

Figure 9B:
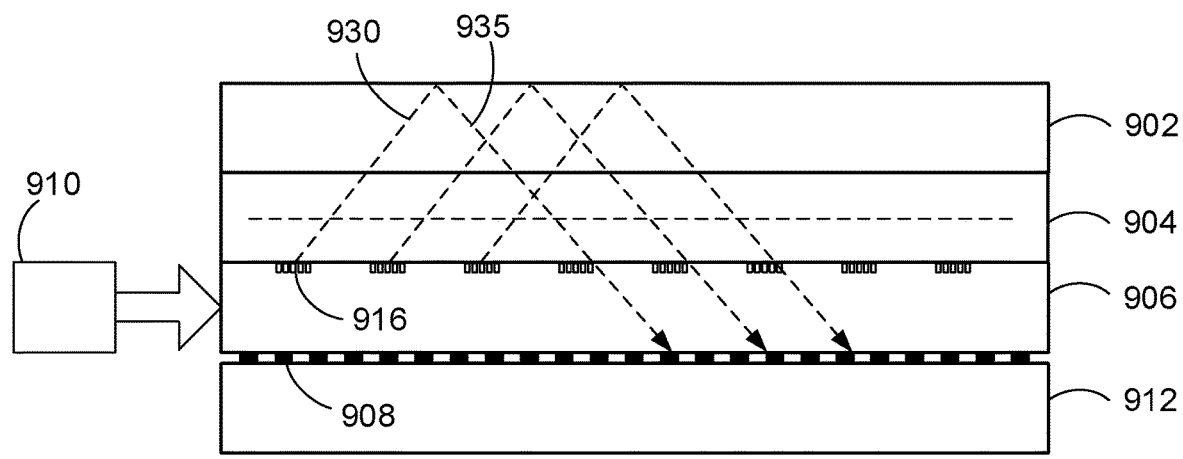

FIG. 9B is a block diagram of a stack-up of components of an electronic device, according to another embodiment. The cover layer 902, display layer 904, light guide 906, and image sensor array 912 in FIG. 9B may be similar to the cover layer 902, display layer 904, light guide 906, and image sensor array 912 shown in FIG. 9A. In FIG. 9B, the arrangement of the light guide 906 and image sensor array 912 in the stack-up is reversed relative to the arrangement shown in FIG. 9A. More specifically, in FIG. 9B, the image sensor array 912 that includes photodetectors 908 is disposed below the light guide 906 that includes the diffraction gratings 916. In operation, light that originates from the light source 910 travels through the light guide 906 until it is diffracted by the diffraction gratings 916 as diffracted light 930. The diffracted light 930 travels towards a sensing surface (i.e., a top surface of the cover layer 902) and is reflected from the sensing surface towards the photodetectors 908 as reflected light 935.

Figure 9C:
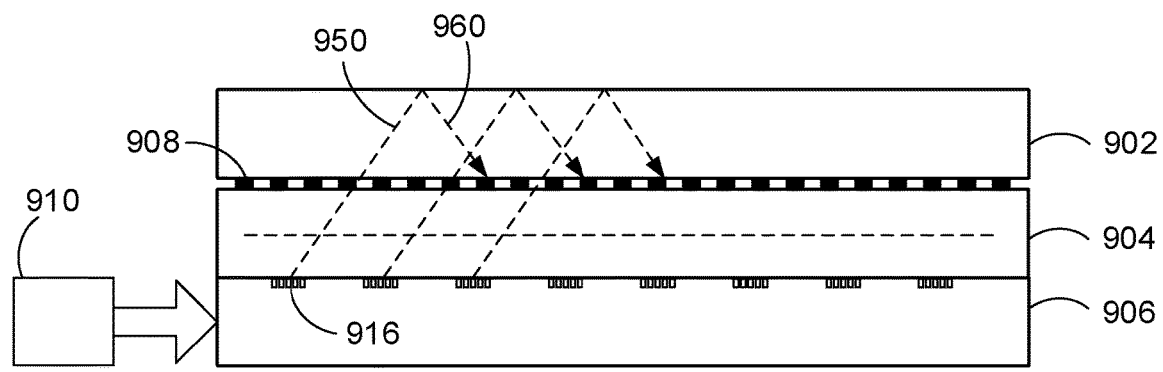

FIG. 9C is another block diagram of a stack-up of components of an electronic device, according to another embodiment. The cover layer 902, display layer 904, and light guide 906 in FIG. 9C may be similar to the cover layer 902, display layer 904, and light guide 906 shown in FIG. 9A. In FIG. 9C, there is no separate image sensor array 912, as is shown in FIGS. 9A-9B. As shown in FIG. 9C, the light guide 906 is disposed below the display layer 904. The display layer 904 is disposed below the cover layer 902. Photodetectors 908 for optical sensing are disposed between the display layer 904 and the cover layer 902. In one embodiment, the photodetectors 908 may be formed on a top surface of the display layer 904. In operation, light from light source 910 enters the light guide and travel through the light guide until it is diffracted by the diffraction gratings 916 as diffracted light 950. The diffracted light 950 travels through the display layer 904 and through the cover layer 902 to a top surface of the cover layer 902, and is reflected from the top surface of the cover layer 902 as reflected light 960. The reflected light 960 is then sensed by the photodetectors 908 to form an image of the input object.

In various implementations of the configurations shown in FIGS. 9A-9C, an adhesive layer may be disposed between the light guide 906, the display layer 904, the cover layer 902, the photodetectors 908, and/or the image sensor array 912.

Figure 10:
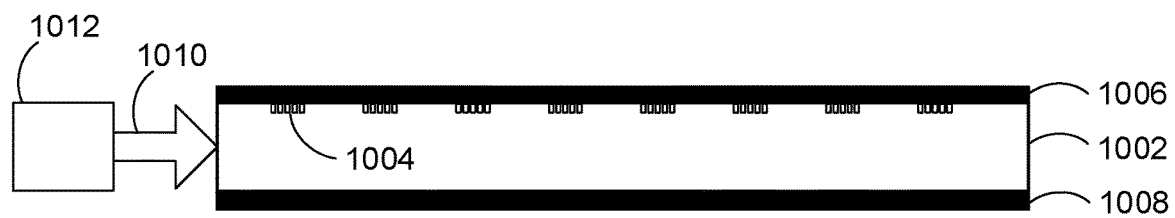
FIG. 10 is a block diagram of a light guide with diffraction gratings disposed between adhesive layers, according to one embodiment.

FIG. 10 is a block diagram of a light guide 1002 with diffraction gratings 1004 disposed between adhesive layers 1006, 1008, according to one embodiment. Adhesive layer 1006 is disposed above the light guide 1002 and adhesive layer 1008 is disposed below the light guide 1002. In various embodiments, the light guide shown in FIG. 8 and FIGS. 9A-9C could be replaced with light guide 1002 shown in FIG. 10. Adhesive layers 1006, 1008 can be comprised of any optically clear adhesive material.

In one embodiment, both adhesive layers 1006, 1008 have a refractive index that is less than the refractive index of the light guide 1002. In some embodiments, where both adhesive layers 1006, 1008 have a refractive index that is less than the refractive index of the light guide 1002, light 1010 from light source 1012 travels through the light guide 1002 without exiting the light guide, except when diffracted by diffraction gratings 1004.

In another embodiment, the adhesive layer 1008 below the light guide 1002 may have a refractive index that is less than the refractive index of the light guide 1002, and the adhesive layer 1006 above the light guide 1002 may have a refractive index that is equal to the refractive index of a layer disposed on the opposite side of adhesive layer 1006, e.g., a cover layer, such as cover glass (see FIG. 8).

Figure 11A:
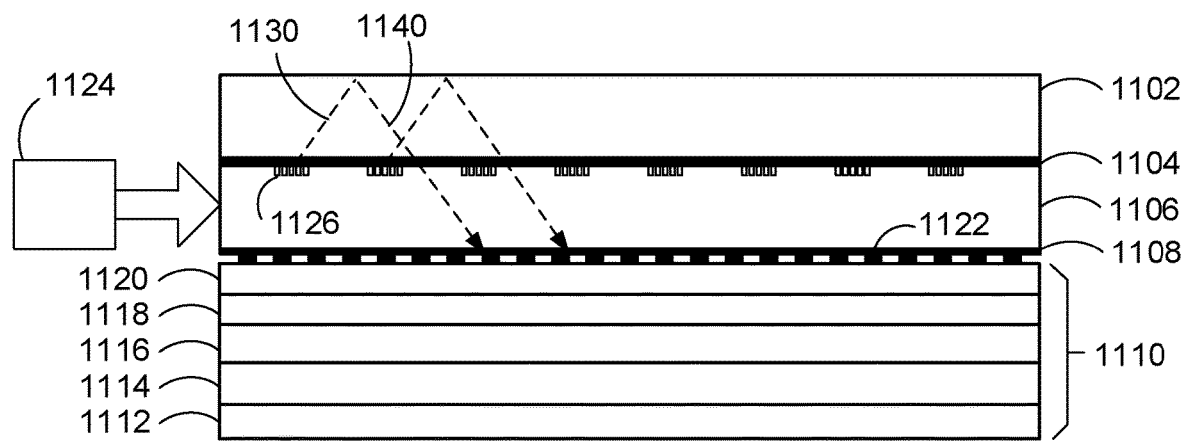
FIGS. 11A-12B are block diagrams of a stack-up of components of an electronic device with an LCD (liquid crystal display), according various embodiments.

FIG. 11A is a block diagram of a stack-up of components of an electronic device with an LCD (liquid crystal display) 1110, according to one embodiment. The electronic device includes cover layer 1102, light guide 1106, and LCD 1110. Adhesive layer 1104 is disposed on a top side of the light guide 1106 and is coupled to a bottom side of the cover layer 1102. Adhesive layer 1108 is disposed on the opposite side (i.e., bottom side) of the light guide 1106.

In one embodiment, LCD 1110 may include a color filter glass 1120, liquid crystals 1118, TFT (thin-film transistor) glass 1116, an LCD backlight 1114, and a reflector 1112. An LCD 1110 is a flat-panel display or other electronically modulated optical device that uses the light-modulating properties of liquid crystals 1118. Liquid crystals 1118 do not emit light directly, instead using the LCD backlight 1114 and/or reflector 1112 to produce images in color or monochrome.

Photodetectors 1122 for sensing an image of an input object are disposed between adhesive layer 1108 and the LCD 1110. In one implementation, the photodetectors 1122 are disposed on the color filter glass 1120 of the LCD 1110.

As described herein, light is emitted from a light source 1124 and enters the light guide 1106. The light travels through the light guide 1106 and is diffracted by diffraction gratings 1126 of the light guide 1106 as diffracted light 1130. The diffracted light 1130 travels towards the cover layer 1102 and is reflected by the top surface of the cover layer 1102 as reflected light 1140. The reflected light 1140 from the top surface of the cover layer 1102 is then detected by the photodetectors 1122. In one embodiment, the diffraction gratings 1126 are configured to refract the light from the light source 1124, and are configured not to diffract display light emitted by the LCD 1110.

Figure 11B:
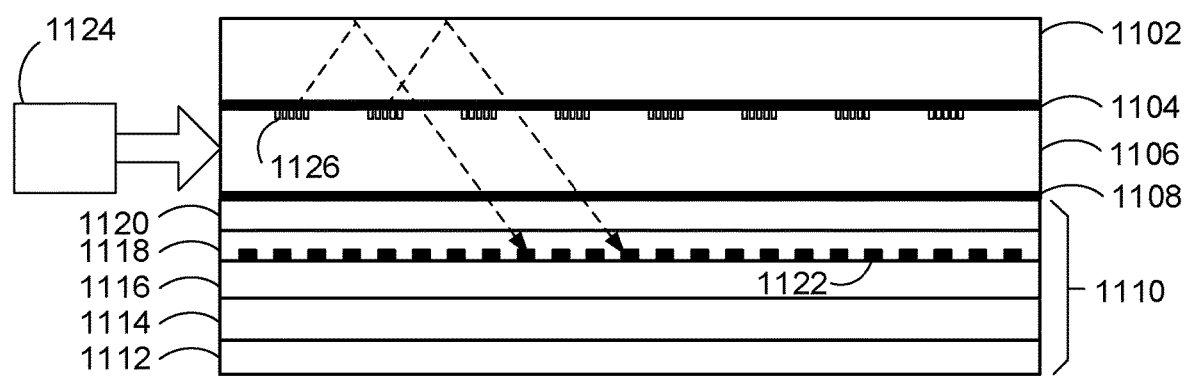

FIG. 11B is a block diagram of a stack-up of components of an electronic device with an LCD (liquid crystal display) 1110, according to another embodiment. The cover layer 1102, LCD 1110, and light guide 1106 in FIG. 11B may be similar to the cover layer 1102, LCD 1110, and light guide 1106 shown in FIG. 11A. In FIG. 11B, the photodetectors 1122 are disposed on the TFT (thin-film transistor) glass 1116 of the LCD 1100, as opposed to being disposed on the color filter glass 1120 of the LCD 1110 (as shown in FIG. 11A).

Figure 12A:
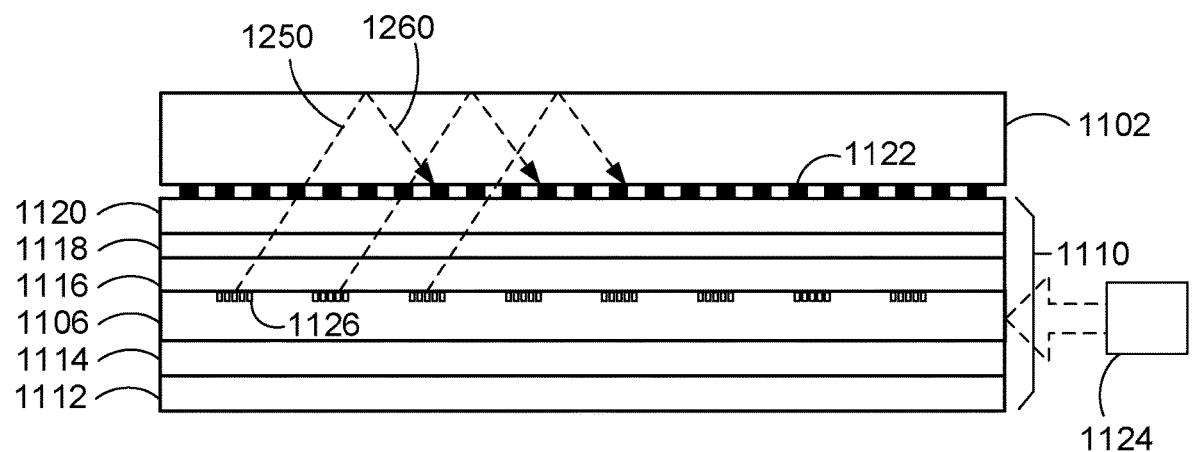

FIG. 12A is a block diagram of a stack-up of components of an electronic device with an LCD (liquid crystal display) 1110, according to one embodiment. The cover layer 1102 in FIG. 12A may be similar to the cover layer 1102 shown in FIG. 11A. Photodetectors 1122 are disposed on the color filter glass 1120 of the LCD 1110.

In FIG. 12A, the light guide 1106 is disposed within the LCD 1110. For example, the light guide 1106 may be disposed between the LCD backlight unit 1114 and the TFT glass 1116. In operation, light from light source 1124 enters the light guide 1106 and travels through the light guide 1106 until it is diffracted by the diffraction gratings 1126 as diffracted light 1250. The diffracted light 1250 travels through the TFT glass 1116, the liquid crystals 1118, the color filter glass 1120 and also through the cover layer 1102 to a top surface of the cover layer 1102. The diffracted light 1250 is reflected from the top surface of the cover layer 1102 as reflected light 1260. The reflected light 1260 travels through the cover layer 1102 (i.e., for a second time), after which the reflected light is then sensed by the photodetectors 1122 to form an image of the input object.

Figure 12B:
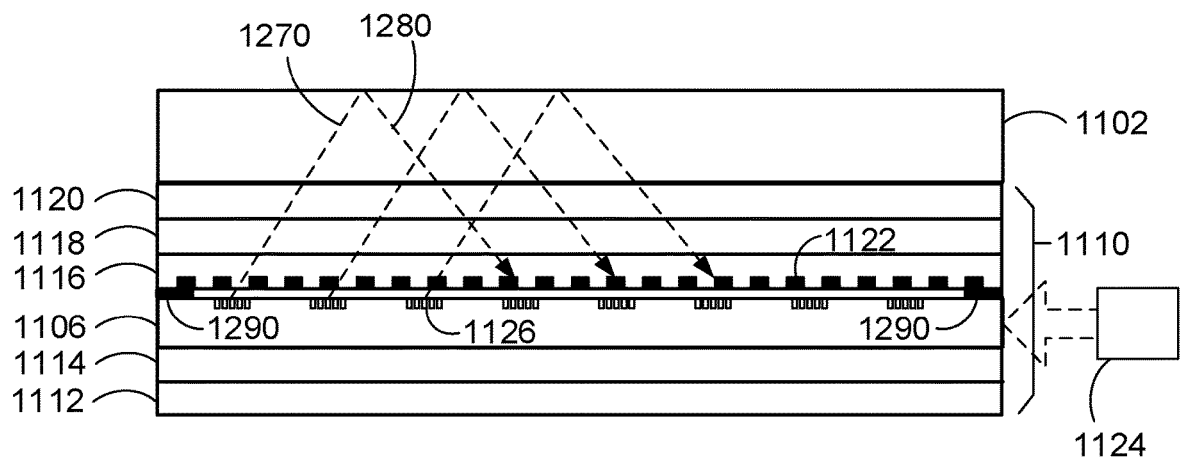

FIG. 12B is another block diagram of a stack-up of components of an electronic device with an LCD (liquid crystal display) 1110, according to one embodiment. The cover layer 1102 in FIG. 12B may be similar to the cover layer 1102 shown in FIG. 12A. Similar to the configuration shown in FIG. 12A, in FIG. 12B the light guide 1106 is part of the LCD 1110. In FIG. 12B, however, the photodetectors 1122 are disposed on the TFT glass 1116 of the LCD 1110 (i.e., disposed below the liquid crystals 1118 of the LCD 1110).

In operation, referring to FIG. 12B, light from light source 1124 enters the light guide 1106 and travels through the light guide 1106 until it is diffracted by the diffraction gratings 1126 as diffracted light 1270. The diffracted light 1270 travels through the TFT glass 1116, the liquid crystals 1118, the color filter glass 1120 and also through the cover layer 1102 to a top surface of the cover layer 1102. The diffracted light 1270 is reflected from the top surface of the cover layer 1102 as reflected light 1280. The reflected light 1280 travels through the cover layer 1102, the color filter glass 1120, the liquid crystals 1118, and the TFT glass 1116, after which the reflected light 1280 is sensed by the photodetectors 1122 to form an image of the input object. As optional adhesive layer 1290 is also shown between the light guide 1106 and the TFT glass 1116.

As shown, in FIG. 12A the photodetectors 1122 are disposed above the liquid crystals 1118 of the LCD 1110; whereas, in FIG. 12B, the photodetectors 1122 are disposed below the liquid crystals 1118 of the LCD 1110.

Figure 13:
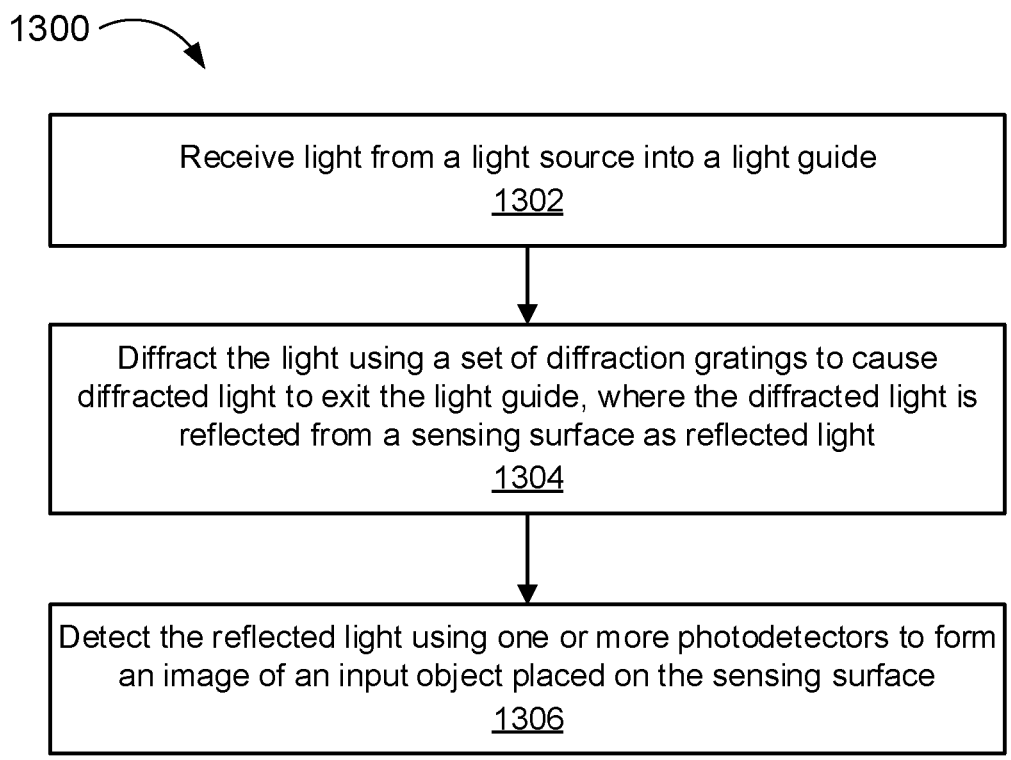
FIG. 13 is a flow diagram of method steps for optical sensing, according to one embodiment.

FIG. 13 is a flow diagram of a method 1300 for optical sensing, according to one embodiment. At step 1302, a light guide receives light from a light source. The light source may cause incident light to enter the light guide from the side of the light guide. In some embodiments, a coupler may couple the light source to the light guide. At step 1304, the light from the light source is diffracted using a set of diffraction gratings to cause diffracted light to exit the light guide. The diffraction gratings may be configured such that diffracted light has certain properties. For example, the diffracted light may have a certain angle or range of angles relative to a surface of the light guide. The diffracted light travels through one or more layers of elements (e.g., cover layer, display layer, etc.) and is reflected from a sensing surface as reflected light. At step 1306, the reflected light is detected using one or more photodetectors to form an image of an input object placed on the sensing surface.

In sum, embodiments of the disclosure provide for systems and methods for optical sensing, where light used for optical sensing is diffracted by diffraction gratings. The diffraction gratings may be disposed on a light guide or on another substrate, such as a cover layer. The diffraction gratings are configured to condition incident light from the light source as diffracted light. The diffracted light is reflected from a sensing surface to capture an image of the input object. By conditioning the light before it is reflected from the sensing surface using the diffraction gratings, no further collimating of the light that is reflected from the sensing surface is needed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device, comprising:
   a light guide configured to receive incident light from a light source;
   a cover layer with a sensing surface configured to receive an input object to be sensed; and
   a set of photodetectors;
   wherein the light guide includes a plurality of diffraction gratings configured to diffract the incident light as diffracted light, wherein the diffracted light exits the light guide and travels towards the sensing surface, the diffracted light is reflected from the sensing surface as reflected light, and the reflected light is sensed by the set of photodetectors to form an image of the input object;
   wherein the plurality of diffraction gratings includes at least one grating structure within each diffraction grating of the plurality of diffraction gratings; and
   wherein, for each diffraction rating of the plurality of diffraction gratings, a length of the at least one grating structure in the diffraction grating increases in proportion to a distance of the diffraction grating from the light source.

2. The device of claim 1, wherein the diffracted light travels towards the sensing surface at an angle that causes the diffracted light that is incident on a portion of the input object to be partially transmitted through the input object and causes the diffracted light that is not incident on a portion of the input object to be reflected from the sensing surface.

3. The device of claim 1, wherein each diffraction grating in the plurality of diffraction gratings comprises two or more grating structures.

4. The device of claim 3,
   wherein the plurality of diffraction gratings includes a first diffraction grating and a second diffraction grating;
   wherein each grating structure in the first diffraction grating has a first length;
   wherein each grating structure in the second diffraction grating has a second length;
   wherein the second diffraction grating is located a greater distance away from the light source than the first diffraction grating; and
   wherein the second length is greater than the first length.

5. The device of claim 3, wherein the two or more grating structures comprise grooves or bumps formed on the light guide.

6. The device of claim 5, wherein the grooves or bumps are formed by chemical etching, embossing, molding, stamping, or printing.

7. The device of claim 1, further comprising:
   a display layer comprising a set of display pixels.

8. The device of claim 7, wherein the light guide is disposed between the display layer and the cover layer.

9. The device of claim 7, wherein the display layer is disposed between the light guide and the cover layer.

10. The device of claim 7, wherein the set of photodetectors is disposed between the light guide and the display layer.

11. The device of claim 1, wherein the light guide comprises a film that is disposed on the cover layer.

12. The device of claim 1, wherein the light source is configured to emit incident light of one or more wavelengths, and the plurality of diffraction gratings are configured to diffract the incident light based on the one or more wavelengths.

13. A light guide, comprising:
   a substrate; and
   a plurality of diffraction gratings;
   wherein:
      the substrate is configured to receive incident light from a light source;
      the plurality of diffraction gratings is configured to diffract the incident light as diffracted light, wherein the diffracted light exits the light guide and travels towards a sensing surface configured to receive an input object to be sensed;

the plurality of diffraction gratings includes at least one grating structure within each diffraction grating of the plurality of diffraction gratings; and for each diffraction grating of the plurality of diffraction gratings, a length of the at least one grating structure in the diffraction grating increases in proportion to a distance of the diffraction grating from the light source.

14. The light guide of claim 13,
wherein each diffraction grating in the plurality of diffraction gratings comprises two or more grating structures;
wherein the plurality of diffraction gratings includes a first diffraction grating and a second diffraction grating;
wherein each grating structure in the first diffraction grating has a first length;
wherein each grating structure in the second diffraction grating has a second length;
wherein the second diffraction grating is located a greater distance away from the light source than the first diffraction grating; and
wherein the second length is greater than the first length.

15. The light guide of claim 14, wherein the grooves or bumps are formed by chemical etching, embossing, molding, stamping, or printing.

16. The light guide of claim 13, wherein the substrate comprises a film and the plurality of diffraction gratings is formed on the film.

17. The light guide of claim 13, wherein the light guide is disposed between a display layer that comprises a set of display pixels and the sensing surface.

18. The light guide of claim 13, wherein a display layer that comprises a set of display pixels is disposed between the light guide and the sensing surface.

19. The light guide of claim 13, wherein the light guide is disposed within a display layer of an electronic device that comprises a set of display pixels.

20. A method for performing optical sensing, the method comprising:
receiving light from a light source into a light guide;
diffracting the light using a plurality of diffraction gratings to cause diffracted light to exit the light guide, where the diffracted light is reflected from a sensing surface as reflected light; and
detecting the reflected light using one or more photodetectors to form an image of an input object placed on the sensing surface;
wherein the diffracted light travels towards the sensing surface at an angle that causes the diffracted light that is incident on a portion of the input object to be partially transmitted through the input object and causes the diffracted light that is not incident on a portion of the input object to be reflected from the sensing surface;
wherein the plurality of diffraction gratings includes at least one grating structure within each diffraction grating of the plurality of diffraction gratings; and
wherein, for each diffraction grating of the plurality of diffraction gratings, a length of the at least one grating structure in the diffraction grating increases in proportion to a distance of the diffraction grating from the light source.

* * * * *